(12) United States Patent
Tsai (10) Patent No.: US 9,878,753 B2
(45) Date of Patent: Jan. 30, 2018

(54) CONTROL UNIT FOR HEIGHT ADJUSTMENT OF A BICYCLE SEAT POST

(71) Applicant: Taiwan Hodaka Industrial Co., Ltd., Taipei (TW)

(72) Inventor: Black Tsai, Taipei (TW)

(73) Assignee: Taiwan Hodaka Industrial Co., Ltd., Taipei (TW)

(*) Notice: Subject to any disclaimer, the term of this patent is extended or adjusted under 35 U.S.C. 154(b) by 159 days.

(21) Appl. No.: 15/063,660

(22) Filed: Mar. 8, 2016

(65) Prior Publication Data

US 2017/0240233 A1   Aug. 24, 2017

(30) Foreign Application Priority Data

Feb. 24, 2016   (TW) .................. 105105555

(51) Int. Cl.
  B62J 1/08   (2006.01)

(52) U.S. Cl.
  CPC ............ B62J 1/08 (2013.01); *B62J 2001/085* (2013.01)

(58) Field of Classification Search
  CPC ..... B62K 19/36; B62J 1/06; B62J 1/08; B62J 1/10; B62J 2001/085; A47C 3/30; Y10T 403/32516; Y10T 403/32483
  See application file for complete search history.

(56) References Cited

U.S. PATENT DOCUMENTS

| | | | | | |
|---|---|---|---|---|---|
| 4,354,398 | A | * | 10/1982 | Porter | B60N 2/231 403/155 |
| 4,807,856 | A | * | 2/1989 | Teckenbrock | B62K 19/36 188/67 |
| 5,909,890 | A | * | 6/1999 | Sachs | B62K 25/286 188/300 |
| 6,220,582 | B1 | * | 4/2001 | Wandschneider | B62J 1/06 267/64.12 |
| 7,059,592 | B2 | * | 6/2006 | Huh | A47C 3/30 188/300 |
| 7,231,866 | B2 | * | 6/2007 | Seong | A47C 3/30 297/344.19 |
| 8,167,373 | B2 | * | 5/2012 | Allison | A47C 3/30 297/344.19 |
| 8,177,251 | B2 | * | 5/2012 | Shirai | B62J 1/08 280/288.4 |
| 8,191,964 | B2 | * | 6/2012 | Hsu | B62K 19/36 280/288.4 |
| 8,308,124 | B2 | * | 11/2012 | Hsu | B62J 1/08 248/161 |
| 8,926,216 | B2 | * | 1/2015 | McAndrews | B62J 1/08 403/109.7 |

(Continued)

FOREIGN PATENT DOCUMENTS

EP   2886428 A1   6/2015
TW   M481860 U   7/2014

*Primary Examiner* — Daniel J Wiley
(74) *Attorney, Agent, or Firm* — Alan D. Kamrath; Kamrath IP Lawfirm, P.A.

(57) ABSTRACT

A control unit for height adjustment of a bicycle seat post mainly includes a body, a controlling arm, and a pivot pin connecting the body and the controlling arm. Besides, a controlling wire is used to control a height adjustment device of the bicycle seat post to work or stop. The control unit of the present invention requires fewer assemblies and it is easy to be assembled.

4 Claims, 7 Drawing Sheets

(56) References Cited

U.S. PATENT DOCUMENTS

| | | | |
|---|---|---|---|
| 2002/0185581 A1* | 12/2002 | Trask | B65D 19/20 |
| | | | 248/346.4 |
| 2013/0269655 A1* | 10/2013 | Yamazaki | F02D 9/1065 |
| | | | 123/403 |
| 2014/0305253 A1 | 10/2014 | Tseng | |
| 2015/0191208 A1 | 7/2015 | Hsu | |
| 2015/0225030 A1 | 8/2015 | Shirai | |

* cited by examiner

FIG. 8

CONTROL UNIT FOR HEIGHT ADJUSTMENT OF A BICYCLE SEAT POST

BACKGROUND OF THE INVENTION

Field of the Invention

The present invention relates to a control unit for height adjustment of a bicycle seat post and, more particularly, to a control unit that requires fewer elements and is easily assembled.

Description of the Prior Art

A height adjustment device of a bicycle seat post is capable of adjusting the height of the bicycle seat post so as to manage the height position of the seat fixed on the top end of the seat post. A control mechanism is used to control the height adjustment device of the bicycle seat post to work or stop. The control mechanism is connected with one end of a wire. Generally, the other end of the wire is fixed to the bicycle handlebar and coupled with a pulling member. When the pulling member is pulled, the wire may drive the control mechanism to push a pin within the height adjustment device of the bicycle seat post to axially move upwards to unlock the oil hydraulic valve inside the height adjustment device of the bicycle seat post to allow the height adjustment device to work. Thus, the seat height position can be adjusted. When the pulling member is released, the pin returns to its home position and the valve locks again. Thus the height adjustment device of the bicycle seat post stops working so as to stop adjusting the seat height and the seat position is secured.

A prior art control mechanism for a bicycle seat post, as disclosed in Taiwan Patent 104200535 and U.S. patent application Ser. No. 14/604,798, comprises a body and a linkage unit. The linkage unit is provided with a pull-down member at the lower portion and a push-up member at the upper portion. The middle section of the pull-down member and the middle section of the push-up member are eccentrically pivoted with the body by a pivot pin respectively. One of the push-up member and the pull-down member provides a connecting pin arranged to a first end where the push-up member and the pull-down member are near each other, and the other one of the push-up member and the pull-down member provides a sliding slot arranged at the first end where the push-up member and the pull-down member are near each other. The opening of the sliding slot is larger than the external diameter of the connecting pin. The connecting pin may pass through the sliding slot. Thus, the push-up member and the pull-down member are combined together with the connecting pin and the sliding slot. The pull-down member is provided with a control end for connecting a controlling wire. The push-up member is arranged with a push-up end under a main pin of the height adjustment device of the bicycle seat post. When the controlling wire is pulled, the push-up end drives the main pin to move upwards so as to direct the height adjustment device of the bicycle seat post to work. The prior art control mechanism for a bicycle seat post is controlled by the controlling wire via the linkage unit. The linkage unit includes the push-up member, the pull-down member, the two pivot pins, and the connecting pin. The prior art control mechanism needs many assemblies and consumes more working time in assembling. It is against the background and the drawbacks associated therewith that the present invention has been developed.

SUMMARY OF THE INVENTION

The objective of the present invention is to provide a control unit for height adjustment of a bicycle seat post which not only requires fewer elements but also allows to be assembled easily.

The control unit disclosed in the present invention comprises a body, a controlling arm, and a pivot pin connecting the body and the controlling arm. Wherein the body is secured to a bottom end of a height adjustment device of a bicycle seat post, has a center provided with a through hole allowing a bottom end of a firing pin configured at the height adjustment device of the bicycle seat post to pass through, and provides a bottom end arranged with a fixing hole at one side of the through hole and a wire-head hole at the other side of the through hole opposite to where the fixing hole is disposed. Wherein the controlling atm, disposed under the body, has an end provided with a pivot hole allowing the pivot pin to insert into to be pivotally connected with the fixing hole, and an opposite end, opposite to the position of the pivot hole is configured, arranged with a sway end. The sway end is provided with an insertion groove having an opening whose backside faces the wire-head hole. The bottom surface of the insertion groove is arranged with a wire hole corresponding to the wire-head hole. Besides, the side of the controlling arm facing the firing pin is disposed with a push-up member protruding towards the firing pin and aligning the firing pin. Wherein, the insertion groove allows an end of a protecting tube to insert into to be secured. Moreover the protecting tube is arranged outside of a controlling wire. The controlling wire passes through the insertion groove via the wire hole. Furthermore, the wire-head hole allows an enlarged head disposed at a wire end of the controlling wire to insert into to be fixed. By virtue of the assemblies, when the controlling wire is pulled, the tube end of the protecting tube pushes the sway end of the controlling arm to take the pivot pin as the pivot center to move towards the body to drive the push-up member to push the firing pin up to move upwards to unlock the oil hydraulic valve within the height adjustment device of the bicycle seat post to allow the height adjustment device to work so as to adjust the seat height position. When the controlling wire is released, the controlling arm is pushed back to its home position by the restoring force of the firing pin to lock the oil hydraulic valve to direct the height adjustment device of the bicycle seat post to stop working, so as to fix the seat height position after adjusted. Because the control unit only comprises a body, a controlling arm, and a pivot pin connecting the body and the controlling arm, a user can manage the height adjustment device of the bicycle seat post to work or stop only by a controlling wire. Therefore, the present invention has the advantages of fewer assemblies and easy assembling.

BRIEF DESCRIPTION OF THE DRAWINGS

In order that the present invention may be more fully understood, a preferred embodiment thereof will now be described with reference to the accompanying drawings, in which.

DESCRIPTION OF THE PREFERRED EMBODIMENTS

The means for achieving the aforesaid objective and the functions of the present invention will become apparent from the following description, taken in connection with the accompanying drawings, wherein a preferred embodiment of the present invention is disclosed.

Referring to FIG. 1 to FIG. 4, a control unit 1 for height adjustment of a bicycle seat post disclosed in the present invention includes a body 10, a controlling arm 20, and a pivot pin 30 connecting the body 10 and the controlling arm 20. The control unit 1 is driven by a controlling wire 3 to direct a height adjustment device 2 of a bicycle seat post to adjust the height position of the bicycle seat post or to stop locating the height position.

Referring to FIG. 3 to FIG. 6, the body 10 has an outer wall provided with a first threaded surface 11 engaged with a second threaded surface 2b on an inner wall of a bottom end of an outer tube 2a arranged to the height adjustment device 2 of the bicycle seat post. The center of the body 10 provides an axial through hole12 which allows a bottom end of a firing pin 2c configured at the height adjustment device 2 of the bicycle seat post to pass through. The bottom end of the body 10 is provided with a fixing hole13 located at one side of the axial through hole12, and a wire-head hole 14 positioned at the other side of the axial through hole12 opposite to where the fixing hole13 is arranged.

Figure 1:
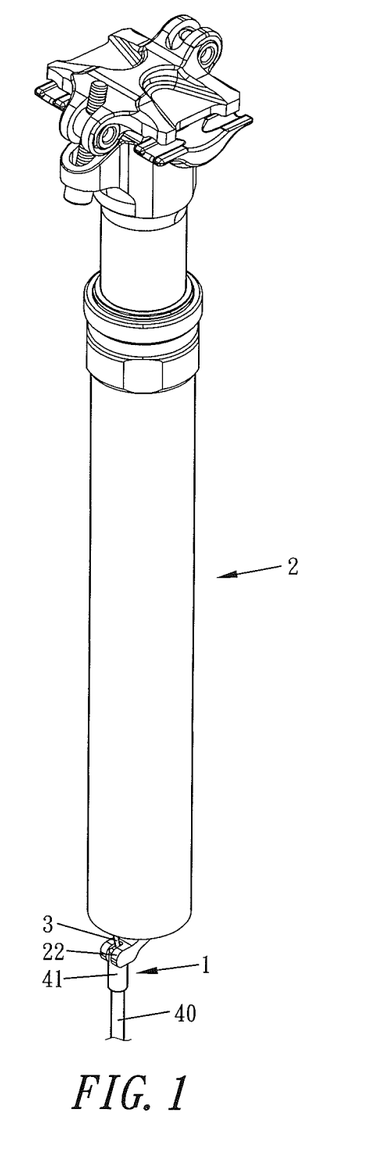
FIG. 1 is a stereogram showing the combination of the control unit and the height adjustment device of the bicycle seat post according to an embodiment of the present invention.
Figure 2:
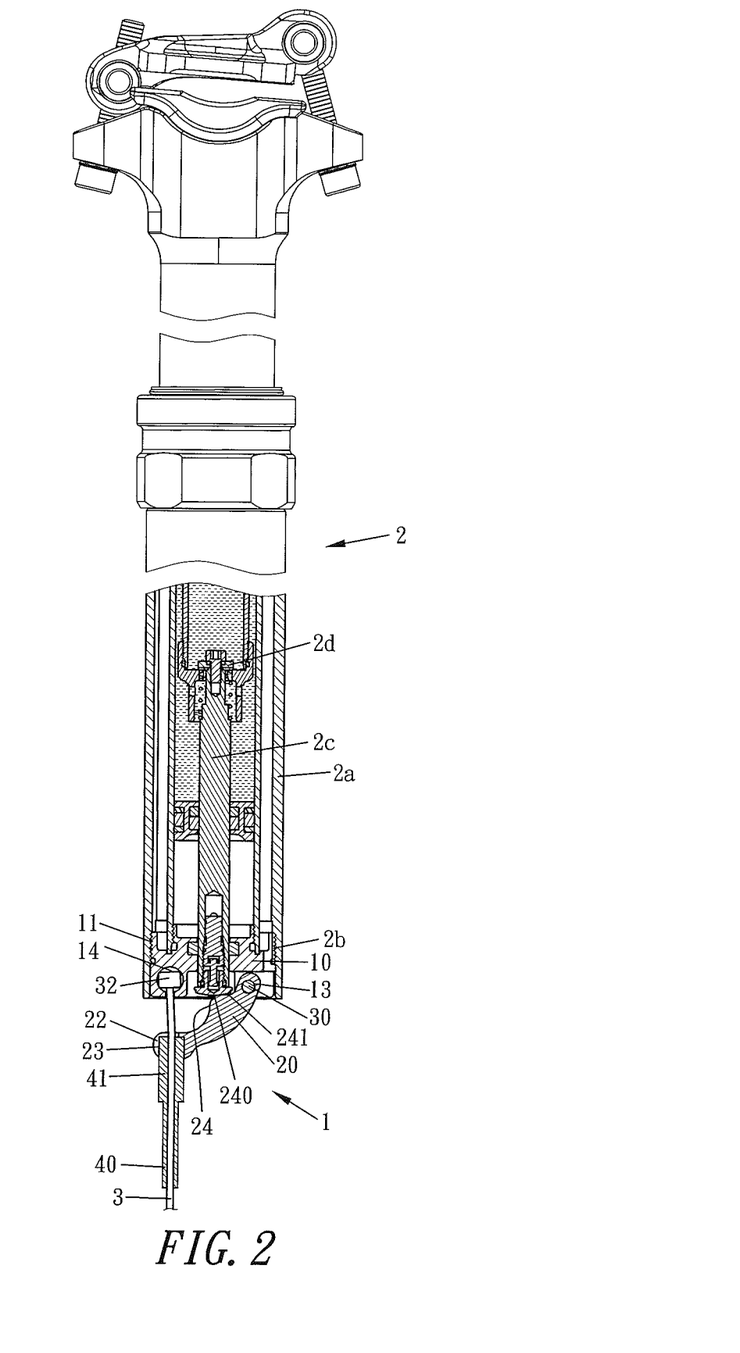
FIG. 2 is a partial section view of the combination of the control unit and the height adjustment device of the bicycle seat post according to the embodiment of the present invention.
Figure 3:
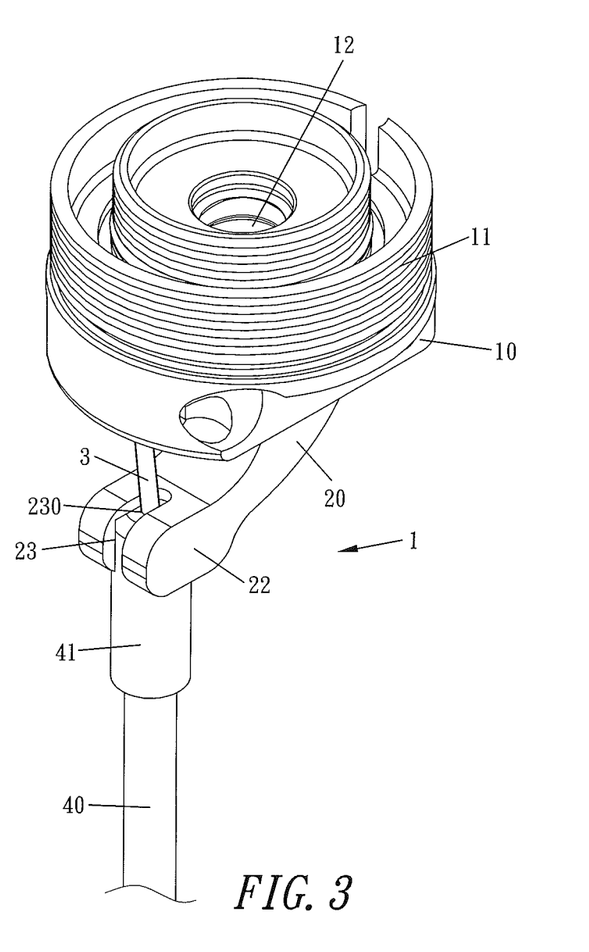
FIG. 3 is a stereogram of the control unit according to the embodiment of the present invention.
Figure 4:
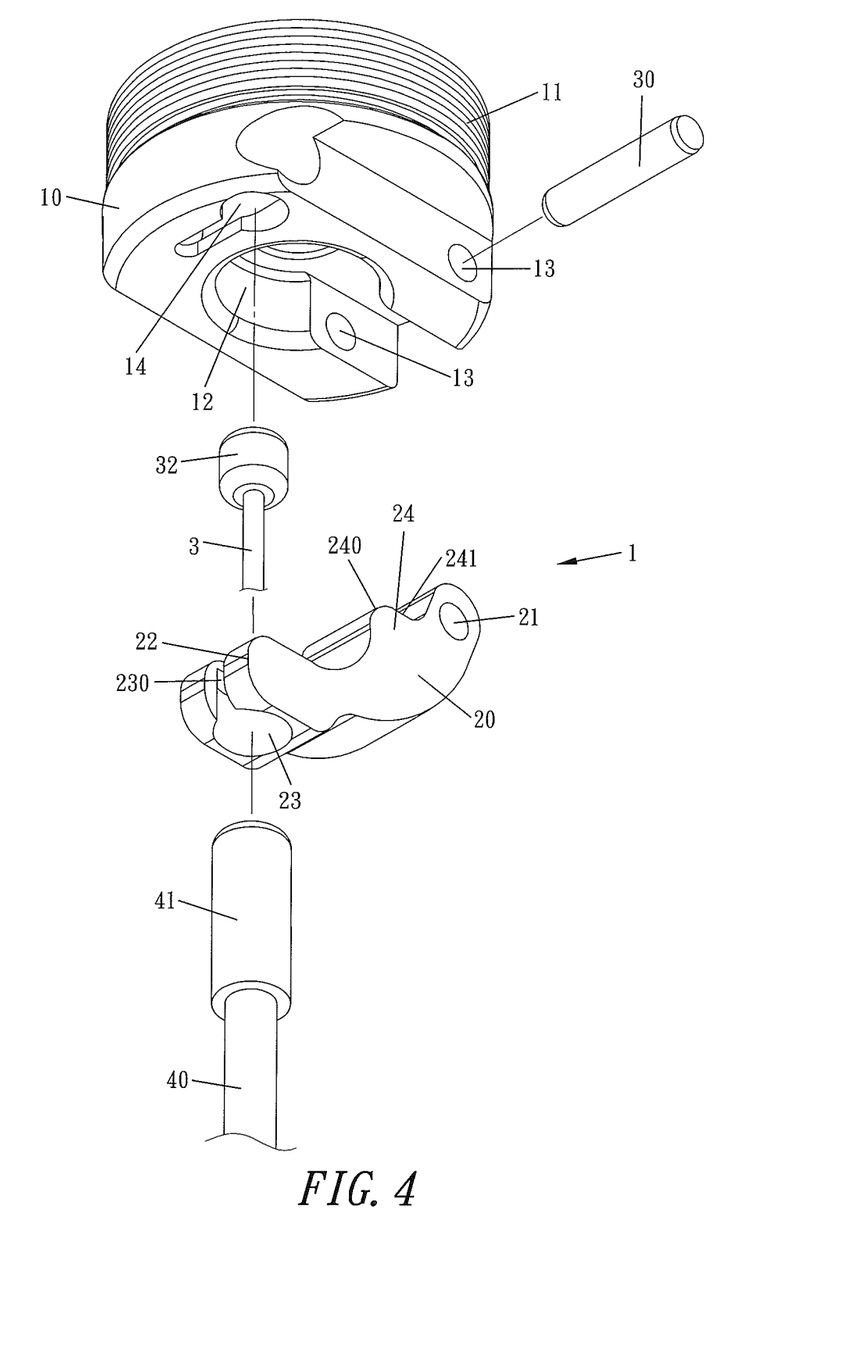
FIG. 4 is a breakdown stereogram of the control unit according to the embodiment of the present invention.
Figure 5:
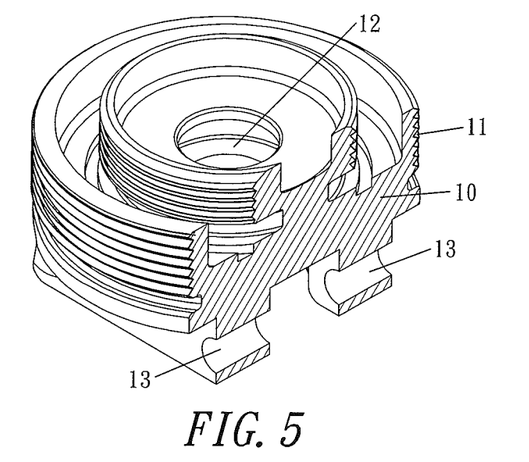
FIG. 5 is a partial section view of the body according to the embodiment of the present invention.
Figure 6:
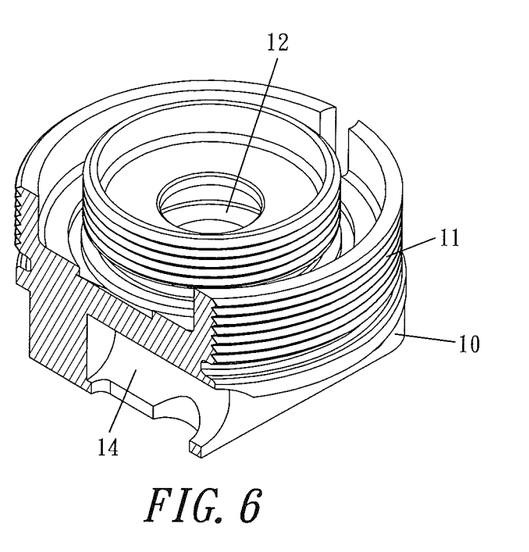
FIG. 6 is a partial section view of the body according to the embodiment of the present invention.
Figure 7:
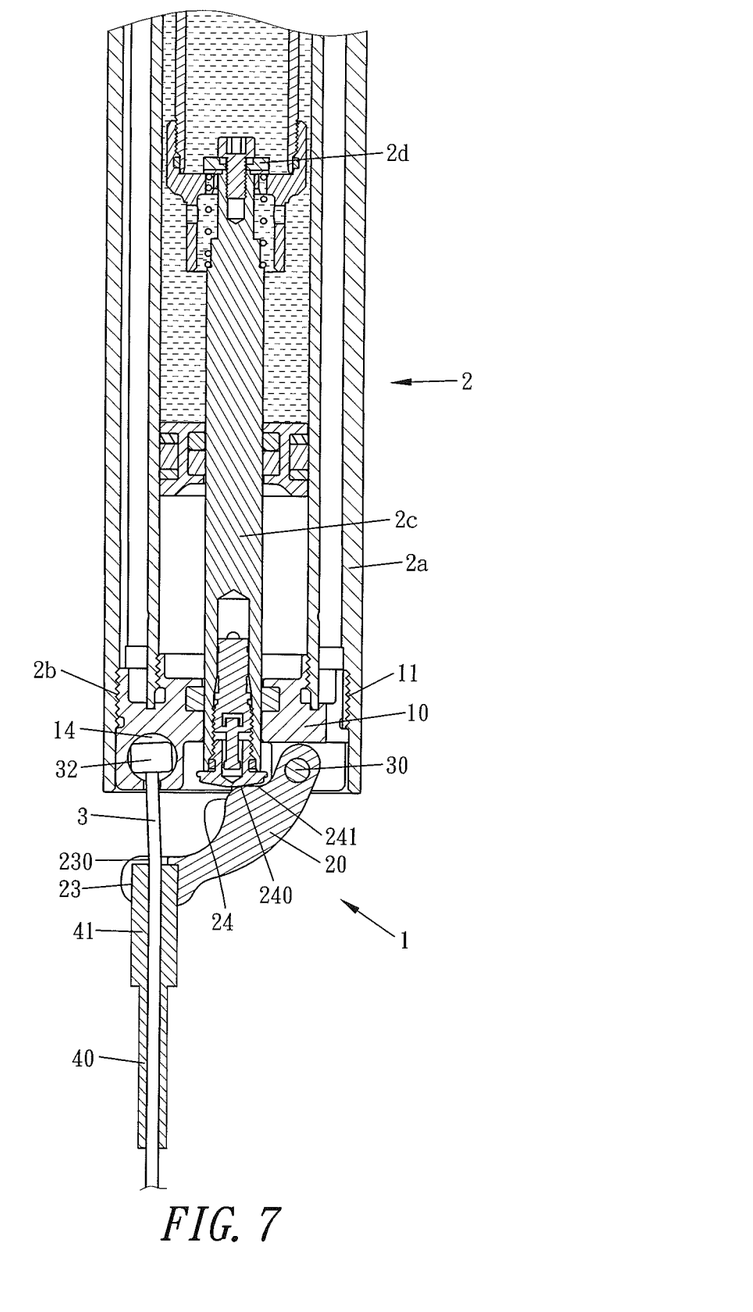
FIG. 7 is a sectional view showing that the control unit is in a state of not working according to the embodiment of the present invention.

As shown in FIG. 4, the controlling arm 20, which is disposed under the body 10, has an end provided with a pivot hole21 and an opposite end, opposite to where the pivot hole21 is configured, arranged with a sway end 22. The pivot hole21 allows the pivot pin 30 to insert into, and the pivot hole21 is pivotally connected with the fixing hole13 by the pivot pin 30. The sway end 22 is provided with an insertion groove 23 having an opening whose backside faces the wire-head hole 14. The bottom surface of the insertion groove 23 provides a wire hole 230 corresponding to the wire-head hole 14. The side of the controlling arm 20 facing the firing pin 2c is arranged with a push-up member 24 which protrudes towards the firing pin 2c and aligns the firing pin 2c. The most protruding portion of the push-up member 24 provides a push end 240 having a side surface provided with an against end 241 which touches the bottom end of the firing pin 2c in a normal state, as shown in FIG. 2 and FIG. 7. The insertion groove 23 allows a tube end 41 of a protecting tube 40 to insert into to be secured. The protecting tube 40 is outside of the controlling wire 3 and allows the controlling wire 3 to pass through. Moreover, the controlling wire 3 passes through the insertion groove 23 via the wire hole 230. The wire-head hole 14 allows an enlarged head 32 disposed at a wire end of the controlling wire 3 to insert into to be secured.

Figure 8:
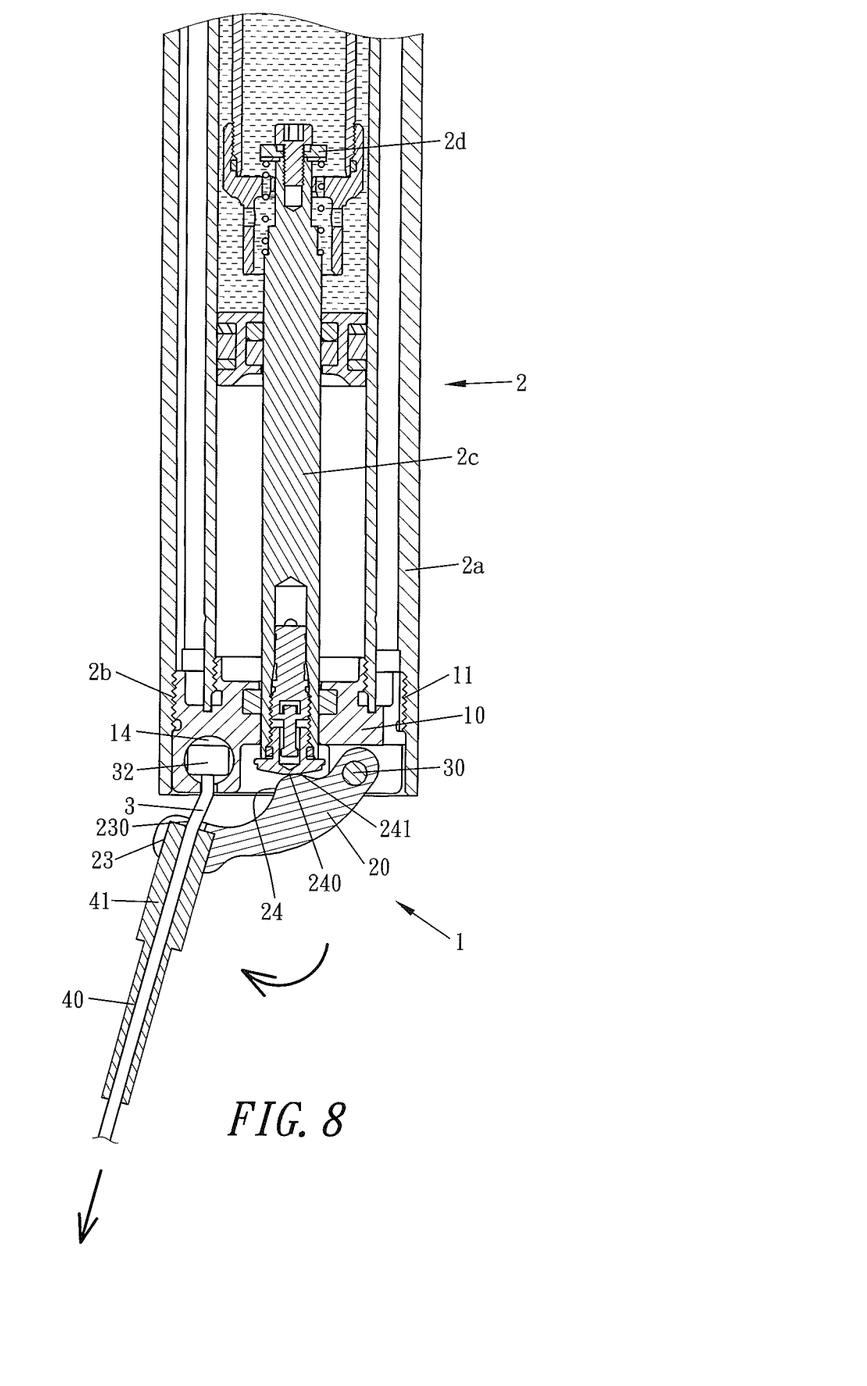
FIG. 8 is a sectional view showing that the control unit is in a state of working according to the embodiment of the present invention.

In virtue of the aforesaid assemblies, when the controlling wire 3 is pulled, the tube end 41 of the protecting tube 40 is pushed up to drive the sway end 22 of the controlling arm 20 to take the pivot pin 30 as the pivot point to eccentrically move towards the body 10. Thus, the push end 240 of the push-up member 24 may push the firing pin 2c up to axially move upwards to unlock the oil hydraulic valve 2d within the height adjustment device 2 of the bicycle seat post to allow the height adjustment device 2 to work, so that the seat height position can be adjusted, as shown in FIG. 8. When the controlling wire 3 is released, the tube end 41 of the protecting tube 40 is pushed back to its home position by an elastic element connected with the firing pin 2c to lock the oil hydraulic valve 2d, as shown in FIG. 2 and FIG. 7. Thus, the height adjustment device 2 of the bicycle seat post is not allowed to work, so that the seat height position can be fixed after being adjusted.

According to the aforesaid, the control unit 1 for height adjustment of a bicycle seat post disclosed in the present invention only includes a body 10, a controlling arm 20, and a pivot pin 30 connecting the body 10 and the controlling arm 20. Besides, the control unit 1 is driven by a controlling wire 3 to manage the height adjustment device 2 of the bicycle seat post to work or stop. The control unit of the present invention requires fewer elements so that it is easy to assemble.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth.

What is claimed is:

1. A control unit for height adjustment of a bicycle seat post, comprising:
    an outer tube;
    an inner tube within the outer tube;
    a body, secured to a bottom end of the outer tube, the body comprising:
        a center with a through hole allowing a bottom end of a firing pin to pass through, and
        a bottom end arranged with a fixing hole at one side of the through hole and a wire-head hole at another side of the through hole opposite to where the fixing hole is disposed; and a controlling arm, disposed under the body, having:
        an end comprising a pivot hole allowing a pivot pin to be inserted therein to be pivotally connected with the fixing hole and
        an opposite end, opposite to where the pivot hole is configured, arranged with a sway end, wherein the sway end comprises an insertion groove having an opening whose backside faces the wire-head hole, wherein a bottom surface of the insertion groove comprises a wire hole corresponding to the wire-head hole, and
        a side with a push-up member which protrudes towards the firing pin and aligns with the bottom end of the firing pin, wherein the side with the push-up member faces the firing pin; wherein the insertion groove receives a tube end of a protecting tube, wherein the protecting tube is arranged outside of a controlling wire;

wherein the controlling wire passes through the insertion groove via the wire hole; and wherein the wire-head hole allows an enlarged head disposed at a wire end of the controlling wire to be fixed to the wire-head hole of the body; and wherein when the controlling wire is pulled so as to pivot the controlling arm, the push-up member pushes the firing pin to thereby unlock a hydraulic valve within the inner tube.

2. The control unit as claimed in claim 1, wherein the push-up member has a most protruding portion providing a push end having a side surface provided with an against end which touches the bottom end of the firing pin in a normal state.

3. The control unit as claimed in claim 2, wherein an outer wall of the body comprises a first threaded surface; wherein an inner wall of a bottom end of the outer tube is provided with a second threaded surface; and wherein the first threaded surface is engaged with the second threaded surface.

4. The control unit as claimed in claim 1, wherein an outer wall of the body comprises a first threaded surface; wherein an inner wall of a bottom end of the outer tube is provided with a second threaded surface; and wherein the first threaded surface is engaged with the second threaded surface.

\* \* \* \* \*